(No Model.) 2 Sheets—Sheet 1.

R. R. WATTERS.
MACHINE FOR SEPARATING SOLID PARTICLES FROM AIR.

No. 424,042. Patented Mar. 25, 1890.

Witnesses
G. H. Simmons
Jno. J. Wagner

Inventor
Rama R. Watters,
By his Attorney
C. R. Humphrey (No Model.) 2 Sheets—Sheet 2.

R. R. WATTERS.
MACHINE FOR SEPARATING SOLID PARTICLES FROM AIR.

No. 424,042. Patented Mar. 25, 1890.

Witnesses
G. H. Simmons
Jno. J. Wagoner

Inventor
Rama R. Watters,
By his Attorney
C. P. Humphrey

UNITED STATES PATENT OFFICE.

RAMA R. WATTERS, OF AKRON, OHIO.

MACHINE FOR SEPARATING SOLID PARTICLES FROM AIR.

SPECIFICATION forming part of Letters Patent No. 424,042, dated March 25, 1890.

Application filed March 7, 1887. Serial No. 229,956. (No model.)

*To all whom it may concern:*

Be it known that I, RAMA R. WATTERS, a citizen of the United States, and a resident of the city of Akron, in the county of Summit and State of Ohio, have invented a new and useful Improvement in Machines for Separating Solid Particles from Air, of which the following is a specification.

The object of my invention is to produce a machine which shall remove and collect the dust incident to flouring and other mills, and which can be used in connection with grain-conveying tubes to convey, collect, and deliver the grain.
My invention consists of the peculiar construction, arrangement, and combination of parts hereinafter described, and then specifically pointed out in the claims, reference being had to the accompanying drawings, which form a part of this specification.

Figure 3:
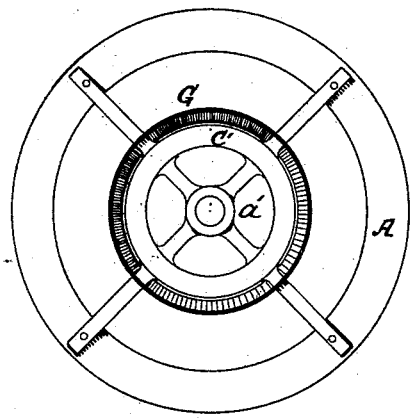
Figure 2:
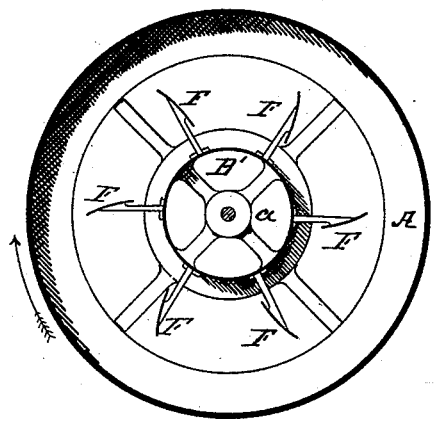
Figure 1:
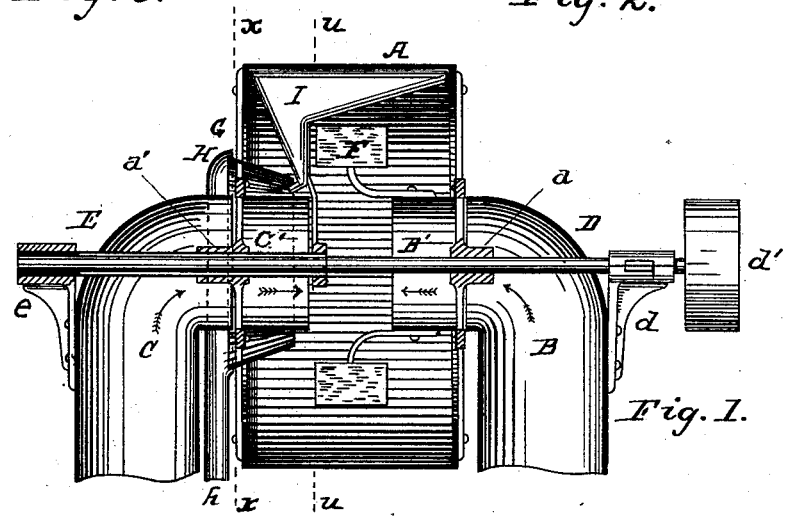
Figures 4, 5:
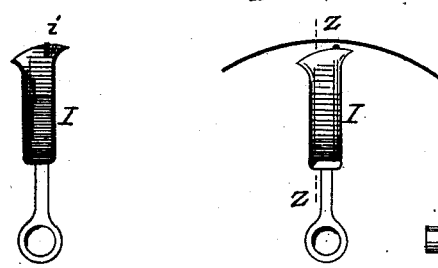
Figure 6:
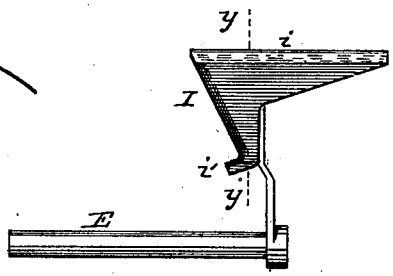
Figure 8:
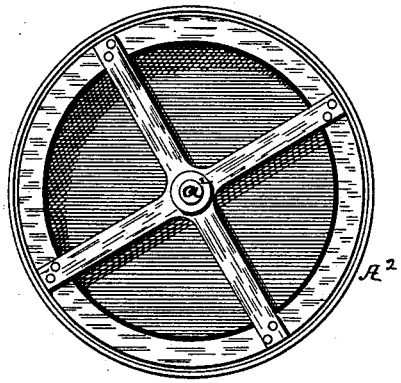
Figure 9:
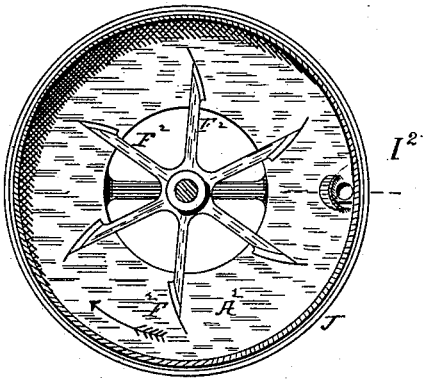
Figure 7:
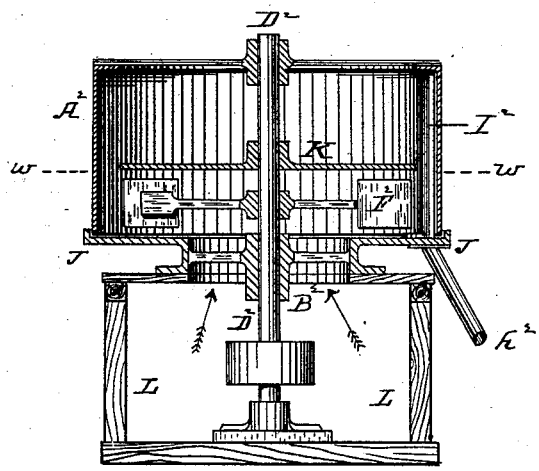
Figure 10:
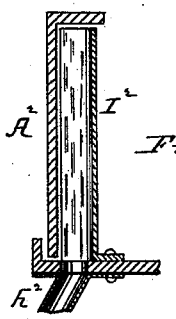

Two forms of my invention are shown in the accompanying drawings, in which similar letters of reference indicate like parts, and in which—
Figure 1 is a vertical central section of one form of my invention, in which the drum revolves vertically; Fig. 2, a transverse vertical section of the same at the line $u\,u$ of Fig. 1; Fig. 3, an end elevation of the drum at the line $x\,x$ of Fig. 1; Fig. 4, an end elevation of the scraper used with the vertically-revolving drum, with a portion of the drum; Fig. 5, a section of the same at the line $y\,y$ of Fig. 6; Fig. 6, a transverse section of the same at the line $z\,z$ of Fig. 4, showing the hollow shaft to which it is attached; Fig. 7, a vertical central section of another form of my invention in which the drum revolves horizontally; Fig. 8, a plan of the same; Fig. 9, a horizontal section of the same at the line $w\,w$; and Fig. 10, a vertical central section, enlarged, of the scraper and a portion of the drum.

In the form of construction shown in Figs. 1 to 6, inclusive, A is a hollow drum having openings in each end, and at the center of each opening a hub $a\,a'$, provided with radial arms or spokes. Two tubes B C, rigidly secured opposite each other, furnish support for brackets $d\,e$, in the latter of which is fixed a hollow shaft E, which constitutes a bearing for one end of the shaft D, the other end of said shaft being journaled in the bracket $d$. The drum A is mounted concentrically between the open ends of the tubes B C on the hubs $a\,a'$, the former of which fits on and is keyed to the shaft D and the latter of which fits and turns on the hollow shaft E. By this arrangement the drum A can be revolved between the ends of the tubes B C by power applied to the pulley $d'$.

Attached to and projecting inward from the arms which extend from the hub $a$ is a short hollow cylinder or tube B' of the same diameter as the tube B, and which practically constitutes an extension, and to this cylinder B' are connected by short arms a number of fan-blades F. Attached to the arms at the opposite end of the drum A is a corresponding hollow cylinder C', which in the same manner extends the tube C, and concentrically about this is also attached a short hollow cone G, the outer end of which enters a hood H, from the lower side of which extends a discharge-pipe $h$.

In operation the drum A is rapidly revolved, and the fan-blades F revolving with it create an exhaust-blast through the tubes B C into the drum A and out through its end openings. The particles of dust or grain are thereby drawn through the tubes B C and driven against the inner face of the drum A, where they are retained by centrifugal force. To remove these adhering particles I employ a scraper I, attached by a short arm to the hollow shaft E. This scraper consists of a hopper-shaped vessel having an open top, across which extends a narrow blade $i$, located close to the inner face of the drum A, and at the lower end a spout $i'$, which enters the space between the cylinders C' G. The particles of grain or dust scraped from the inner face of the drum A by the blade $i$ fall into the scraper I, and pass thence through the tube $i'$ into the hood H and discharge-pipe $h$.

In the form shown by Figs. 7 to 10, inclusive, L is a frame, upon which is a circular bed J, having around its outer edge an upwardly-projecting rim and through its center an opening $B^2$, through which the dust-laden air enters the interior of the machine either directly or from a tube, which it has not been deemed necessary to show, as its form and location will be obvious from the other drawings. A shaft $D^2$ is journaled in a step in the bottom of said frame and a bearing suspended in the center of the opening $B^2$, and on this shaft is rigidly mounted a hollow drum $A^2$, having an opening in the top, the bottom being entirely open and its lower edge close to the bed J, and the inside of the rim about its outer edge. A series of fan-blades $F^2$ is also attached to said shaft by short arms and revolve therewith. Above these fans, either attached to the drum or shaft, but preferably the latter, is a disk K, less in diameter than the said drum, and which deflects the air against the inner periphery of the drum.

In operation the dust-laden air enters from below through the opening $B^2$, is deflected outwardly by the disk K, and escapes through an opening in the top, the dust or grain particles being retained on the inner periphery of the drum by centrifugal force, whence they are removed by the scraper $I^2$. The scraper $I^2$ consists of a metallic post, crescent-shaped in cross-section, securely bolted to the circular bed J, with its hollow face toward the inner periphery of the drum and one edge in close proximity thereto. At its lower end is a hole through the bed J, in which is a delivery-pipe $h^2$, and the particles scraped off by the scraper $I^2$ fall along its hollow face, enter the pipe $h^2$, and are discharged outside the machine.

As the fan is only necessary for producing a current of air into the drum, its location within the drum is not essential to complete the machine or to its perfect operation, as it will be apparent that any ordinary form of fan may be adopted and may be located outside the drum, provided it be so connected with the machine as to cause a current of air through the drum.

A disk similar to the disk K may, if desired, be mounted on the shaft D in the drum A, to assist in deflecting the particle-laden air against the inner periphery of the drum.

Having thus described my invention, what I claim, and desire to secure by Letters Patent, is—

1. A machine for separating solid particles from air, consisting of a drum having end openings, means for causing a current of air to pass through said drum, a shaft within said drum and upon which it is mounted, means for imparting a rapid rotary motion to said shaft and drum, a scraper to remove the adhering solid particles from said drum, and a spout to convey said particles from said scraper, substantially as set forth.

2. In a machine for separating solid particles from air, the combination of a drum having end openings, a shaft within said drum and on which it is mounted, a fan mounted on said shaft within said drum, means for imparting a rapid rotary motion to said shaft, drum, and fan, a scraper to remove the solid dust particles from said drum, and a spout to convey said particles from said scraper, substantially as shown, and for the purpose specified.

3. In a machine for separating solid particles from air, the combination of a drum having end openings, a shaft within said drum and on which it is mounted, a fan mounted on said shaft within said drum, means for imparting a rapid rotary motion to said shaft, drum, and fan, a tube to convey the particle-laden air to said drum, a scraper to remove the particles from said drum, and a spout to convey said particles from said scraper, substantially as shown, and for the purpose specified.

4. In a machine for separating solid particles from air, the combination of a drum having end openings, a shaft within said drum and on which it is mounted, a fan mounted on said shaft within said drum, a solid disk mounted on said shaft within said drum, means for imparting a rapid rotary motion to said shaft, drum, fan, and disk, a scraper to remove the particles from said drum, and a spout to convey the particles from said scraper, substantially as shown, and for the purpose specified.

In testimony that I claim the foregoing I have hereunto set my hand this 16th day of February, A. D. 1887.

RAMA R. WATTERS.

Witnesses:
  C. P. HUMPHREY,
  G. H. SIMMONS.